Patented Jan. 1, 1952

2,581,113

UNITED STATES PATENT OFFICE 2,581,113

PROTEIN ADHESIVES CONTAINING DICYANOGUANIDINE COMPOUNDS AS FLUIDIZING AGENTS

Chester Grey Landes, New Canaan, and John Studeny, Stamford, Conn., assignors to American Cyanamid Company, New York, N. Y., a corporation of Maine No Drawing. Application September 22, 1948, Serial No. 50,658

11 Claims. (Cl. 106—146)

This invention relates to proteinaceous adhesives and relates more particularly to proteinaceous adhesive compositions containing an agent which serves to impart thereto greatly improved fluidity and fluid stability without altering the desirable adhesive characteristics of such compositions.

Adhesive and sizing compositions in which alkali-solubilized proteins constitute the principal adhesive agent are in wide commercial use for such purposes as bonding together sheets of paper or board, wood plies, textile sheets, and the like, and as sizes for paper, textiles, etc. In these compositions a protein is used which forms a water-soluble or water-dispersible alkali metal or ammonium salt, the most common being casein and vegetable proteins such as corn protein (zein), wheat protein (gliadin), barley protein (hordein), and soya protein, the principal constituent of which is glycinin. Ordinarily the protein is dispersed in a water solution of the solubilizing alkali, with or without the aid of organic solvents such as ethanol or dispersing agents such as rosin soaps and the like, and the resulting dispersions are employed directly as liquid adhesives or sizes.

Aqueous alkaline protein dispersions which are employed as adhesives usually contain from about 10% to about 35% of solids of which the protein comprises the major portion. Where the dispersions are to be employed as sizing compositions, the content of protein solids usually is from 1% to 10% of the weight of the dispersions. Similarly, in coating compositions for incorporating fillers in paper, textiles, etc., from 1 to about 15% of protein is present in the coating mixture.

On the other hand, casein and soya proteins have been used extensively in the preparation of dry adhesive mixes. In these compositions the protein material is dry mixed with varying proportions of alkaline agents which aid in dispersing or solubilizing the protein in water. Such alkaline agents as sodium hydroxide, potassium hydroxide, ammonium hydroxide, and similar alkaline agents consisting of monovalent ions are commonly employed for this purpose. Also included in the dry adhesive mix is an alkali containing a polyvalent metal such as, for example, calcium hydroxide. The heavy metal alkaline material serves to precipitate the protein from solution or dispersion and imparts to the adhesive, when dispersed in water, relatively quick setting properties.

Heretofore, various disadvantages have attended the use of protein adhesives. In the use of liquid protein adhesives, it has been impracticable to employ more than about 25–35% of protein based on the total mix because of the quick-gelling nature of these adhesives. For this reason it has been the custom to prepare an aqueous alkaline protein adhesive containing from 10–25% of protein and to use the composition as quickly as possible to avoid waste through gelling thereof. The same is true of protein sizing compositions.

In coating compositions containing casein, soya protein, wheat protein, peanut protein, zein, or the like, it has been impossible to obtain smooth flowing properties in coatings containing more than about 10–15% of protein solids. The art has recognized this as a problem which is always attendant upon the use of thixotropic substances. The mechanical ease of brush, knife, or roll application of thixotropic materials varies considerably with their viscosities in liquid carriers and, as regards protein coating compositions, the aforestated quantities represent the practical upper limits permissible in use in the commercially accepted equipment.

In regard to the dry protein adhesive mixes, it has heretofore been impracticable to employ aqueous dispersions thereof containing more than about 25% of protein due to the quick setting characteristics imparted thereto by the polyvalent metal alkaline materials.

We have discovered that protein adhesives may be rendered less viscous in aqueous dispersion and may be stabilized against premature gelling by the addition thereto of small amounts of alkali metal and ammonium salts of dicyanoguanidine. Representative members of this group of compounds include sodium dicyanoguanidine, potassium dicyanoguanidine, and ammonium dicyanoguanidine. All of these compounds are solid, water-soluble materials which are also stable in aqueous alkaline solutions, and all of the compounds are soluble in aqueous protein dispersions. Since all of the members of our preferred group of fluidifying agents are solid materials, it will be apparent that they may be compounded as desired, with either the ordinary liquid protein adhesive compositions or with the commercially employed dry proteinaceous adhesive mixes.

The amounts of our novel fluidifying agents which may be satisfactorily employed are within the range of from about 5% to about 30% based on the weight of the particular dry proteinaceous compound used. Greater amounts of the fluidifying agents may be employed if desired although for commercial practicability, amounts greater than about 30% of the agents will not ordinarily be used.

Our invention, in its broadest aspect, comprises the preparation of protein adhesive compositions which are characterized by initial viscosities when in aqueous condition that are much lower than the viscosities of similar adhesives heretofore employed in the art, and which are of greatly improved fluid stability. The improved fluidity and stability of the protein adhesives of the present invention are obtained by the presence therein of from about 5% to about 20–30% of any of the above-described fluidifying agents. Our novel fluidifying agents may be added to liquid protein adhesive compositions, thus lowering the initial viscosity of the adhesives and extending their working life. Additionally, when our novel fluidifying agents are employed, it is possible to prepare liquid proteinaceous adhesive compositions containing much larger amounts of protein than it has heretofore been possible to use. For example, we may prepare liquid proteinaceous adhesives containing up to about 35–40% of protein in contrast to the 20–30% which was the upper limit according to prior art procedures, and these compositions containing increased quantities of protein are still sufficiently fluid that they may be employed by the ordinary roll, calender, knife spreader, and the like application methods.

On the other hand, our novel fluidifying agents may be added to dry protein adhesive compositions simply by dry mixing the components of the mix. The dry composition may be stored indefinitely without deterioration and may thereafter be dispersed in water and applied according to well known procedures. The presence of alkali metal and ammonium salts of dicyanoguanidine does not interfere with the precipitating action of heavy metal bases present in the dry protein adhesives, but our novel fluidifying agents greatly extend the working life of such adhesives by virtue of the fact that they decrease the initial viscosity thereof when in liquid condition.

The outstanding advantage to be derived from the present invention resides in the fact that our improved protein adhesive compositions remain fluid and usable in aqueous condition for exceptionally long periods of time. Those compositions of relatively low protein content, such as 5–10%, are stabilized against thickening, while the rate of gelation is greatly reduced in adhesives having a higher content of protein, such as 10–40% or more.

Another advantage of the present invention is that the presence of our novel fluidifying agents in the adhesive compositions permits the preparation of aqueous adhesives containing up to about 35–40% of protein in contrast to the previous upper commercial limit of about 20–30% of protein.

A further advantage of our invention is that, due to the fact that all of our novel fluidifying agents are solid, water-soluble compositions, it is possible to prepare dry protein adhesive compositions which may be stored indefinitely and which, when dispersed in water, remain fluid and usable for long periods of time.

The following examples are presented to more fully explain our invention. The examples are given primarily for illustrative purposes and other embodiments of the invention may be employed within the scope of the appended claims.

*Example 1*

Twenty grams of potassium dicyanoguanidine were dissolved in 283 grams of water and 107 grams of commercial casein (94.44% casein) were added to the solution. After soaking for about 15 minutes, 14 grams of ammonium hydroxide (28.42% $NH_3$) were added, after which the dispersion was heated to 93° F. on a water bath while the mixture was continually stirred. The so-obtained liquid casein adhesive contained approximately 25% of casein solids. The product had an initial Brookfield viscosity of 21,700 centipoises at 30 R. P. M. After aging for 24 hours at 72° F., the composition had a viscosity of about 100,000 centipoises, and after 10 days the adhesive was still pourable. A control sample which was similarly prepared but which contained no fluidifying agent had an initial Brookfield viscosity greater than 100,000 centipoises and gelled upon aging for 24 hours at 72° F.

*Example 2*

The procedure of Example 1 was repeated except that the adhesive composition was fluidified with ammonium dicyanoguanidine instead of potassium dicyanoguanidine. The initial viscosity of the stabilized adhesive was 20,760 centipoises in contrast to more than 100,000 centipoises for the control sample containing no fluidifying agent.

*Example 3*

A dry adhesive mixture was prepared by mixing together 70 grams of commercial casein, 4 grams of silica powder, 6 grams of $Na_2CO_3$, 10 grams of sodium metasilicate, 5 grams of sodium fluoride, and 5 grams of $Ca(OH)_2$. The dry materials were mixed in a mortar without grinding. Twenty grams of this dry mix were dispersed in 45 grams of water. The aqueous dispersion had a Brookfield viscosity of 14,000 centipoises at 60 R. P. M. 1 hour after being dispersed in water.

To two other 20 gram portions of the above-described dry mix was added, respectively, 1.4 grams of sodium dicyanoguanidine and 1.4 grams of ammonium dicyanoguanidine, and each of these dry mixtures was dispersed in 45 grams of water. The sample containing the sodium dicyanoguanidine had a Brookfield viscosity of 4,860 centipoises at 60 R. P. M. 1 hour after being dispersed in water, while the sample containing the ammonium dicyanoguanidine had a corresponding viscosity of 2,320 centipoises.

*Example 4*

The procedure of Example 3 was repeated except that 4.2 grams of potassium dicyanoguanidine was employed as the fluidifying agent. The initial Brookfield viscosity of the aqueous dispersion was 4,600 centipoises.

*Example 5*

Sixty-six grams of alpha protein (a soya protein) were soaked for 15 minutes in 240 grams of water, after which 40 grams of water containing 7.8 grams of sodium carbonate, 1.8 grams of borax, and 6 grams of potassium dicyanoguanidine were added to the dispersion. The mixture was heated at 140° F. for 15 minutes.

A control sample was prepared similarly to the above-described sample except that no fluidifying agent was employed. Both samples were tested for initial viscosity with a Brookfield viscosimeter at 6 R. P. M., and after standing for 19 hours the samples were again tested. Test results were as follows:

| Fluidifying Agent | Brookfield Viscosity in Centipoises—6 R. P. M. | |
|---|---|---|
| | Initial | 19 hours |
| Control—none | 4,520 | 46,000 |
| Potassium dicyanoguanidine | 2,400 | 20,800 |

From the foregoing description it will be seen that the present invention affords protein adhesive compositions which have greatly reduced viscosities in aqueous condition and which remain fluid and usable for long periods of time. The aqueous adhesives may be employed according to accepted methods, as by tub or calender application, roll, brush, or knife coaters, or by other known methods with the advantages described above. Inasmuch as the initial viscosities of our novel adhesive compositions are extremely low, the content of protein which may be employed may be much greater than that which it was previously possible to employ. Similarly, since the novel protein adhesive compositions of the invention are fluid stable, waste of protein material is thus minimized, affording a long needed advantage over the prior art commercial adhesives containing casein, wheat protein, soya protein, barley protein, zein, and the like proteinaceous materials.

What we claim is:

1. An aqueous adhesive composition consisting essentially of about 5 to 35 percent by weight of an alkali-solubilized protein dispersed in about 95 to 65 percent of water, together with from about 5 to 30 percent, based on the dry weight of said protein, of a member selected from the group consisting of ammonium and alkali metal salts of dicyanoguanidine.

2. An aqueous adhesive composition consisting essentially of about 5 to 35 percent by weight of an alkali-solubilized casein dispersed in about 95 to 65 percent of water, together with from 5 to 30 percent, based on the dry weight of said casein, of a member selected from the group consisting of ammonium and alkali metal salts of dicyanoguanidine.

3. A dry composition suitable for dispersion in water to form an adhesive composition containing up to about 40% of protein comprising essentially a mixture of casein, a water-soluble alkali in amount sufficient to solubilize said casein, and a fluidifying amount within the range of from 5 to 30 percent, based on the dry weight of the casein, of a member selected from the group consisting of ammonium and alkali metal salts of dicyanoguanidine.

4. An aqueous adhesive composition consisting essentially of about 5 to 35 percent by weight of an alkali-solubilized soya protein dispersed in about 95 to 65 percent of water, together with from 5 to 30 percent, based on the dry weight of said soya protein, of a member selected from the group consisting of ammonium and alkali metal salts of dicyanoguanidine.

5. A dry composition suitable for dispersion in water to form an adhesive composition containing up to about 40% of protein comprising essentially a mixture of soya protein, a water-soluble alkali in amount sufficient to solubilize said soya protein, and a fluidifying amount within the range of from 5 to 30 percent, based on the dry weight of the protein, of a member selected from the group consisting of ammonium and alkali metal salts of dicyanoguanidine.

6. A dry composition suitable for dispersion in water to form an adhesive composition containing up to about 40% of protein comprising casein having admixed therewith a sufficient quantity of a water-soluble alkali to solubilize said casein and a fluidifying amount within the range of from 5 to 30 percent, based on the dry weight of the casein, of potassium dicyanoguanidine.

7. A dry composition suitable for dispersion in water to form an adhesive composition containing up to about 40% of protein comprising casein having admixed therewith a sufficient quantity of a water-soluble alkali to solubilize said casein and a fluidifying amount within the range of from 5 to 30 percent, based on the dry weight of the casein, of sodium dicyanoguanidine.

8. A dry composition suitable for dispersion in water to form an adhesive composition containing up to about 40% of protein comprising casein having admixed therewith a sufficient quantity of a water-soluble alkali to solubilize said casein and a fluidifying amount within the range of from 5 to 30 percent, based on the dry weight of the casein, of ammonium dicyanoguanidine.

9. A dry composition suitable for dispersion in water to form an adhesive composition containing up to about 40% of protein comprising soya protein having admixed therewith a sufficient quantity of a water-soluble alkali to solubilize said soya protein and a fluidifying amount within the range of from 5 to 30 percent, based on the dry weight of the soya protein, of potassium dicyanoguanidine.

10. A dry composition suitable for dispersion in water to form an adhesive composition containing up to about 40% of protein comprising soya protein having admixed therewith a sufficient quantity of a water-soluble alkali to solubilize said soya protein and a fluidifying amount within the range of from 5 to 30 percent, based on the dry weight of the soya protein, of sodium dicyanoguanidine.

11. A dry composition suitable for dispersion in water to form an adhesive composition containing up to about 40% of protein comprising soya protein having admixed therewith a sufficient quantity of a water-soluble alkali to solubilize said soya protein and a fluidifying amount within the range of from 5 to 30 percent, based on the dry weight of the soya protein, of ammonium dicyanoguanidine.

CHESTER GREY LANDES.
JOHN STUDENY.

REFERENCES CITED

The following references are of record in the file of this patent:

UNITED STATES PATENTS

| Number | Name | Date |
|---|---|---|
| 1,886,750 | Shisler | Nov. 8, 1932 |
| 1,952,941 | Ripper | Mar. 27, 1934 |
| 2,482,879 | Schmutzler | Sept. 27, 1949 |

FOREIGN PATENTS

| Number | Country | Date |
|---|---|---|
| 115,770 | Australia | Sept. 3, 1942 |